(12) United States Patent
Yoshida et al.

(10) Patent No.: US 6,676,183 B2
(45) Date of Patent: Jan. 13, 2004

(54) VEHICLE BODY FRAME STRUCTURE

(75) Inventors: Itsuo Yoshida, Wako (JP); Shigeto Yasuhara, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/353,132

(22) Filed: Jan. 27, 2003

(65) Prior Publication Data

US 2003/0164623 A1 Sep. 4, 2003

(30) Foreign Application Priority Data

Jan. 30, 2002 (JP) ........................................ 2002-022047

(51) Int. Cl.$^7$ .............................................. B62D 27/00
(52) U.S. Cl. ..................... 296/30; 296/203.01; 296/204; 280/781
(58) Field of Search ............................... 296/30, 203.04, 296/203.02, 203.01, 203.03; 280/781, 785; 52/252, 741.3; 180/291

(56) References Cited

U.S. PATENT DOCUMENTS

| | | | | |
|---|---|---|---|---|
| 2,021,780 A | * | 11/1935 | Harmon ........................ | 280/781 |
| 4,333,285 A | * | 6/1982 | Koizumi et al. ............... | 52/252 |
| 4,563,035 A | * | 1/1986 | Hirakami et al. .......... | 296/203.04 |
| 4,822,096 A | * | 4/1989 | Fujii ....................... | 296/203.02 |
| 5,567,005 A | * | 10/1996 | Kosuge et al. ................. | 296/30 |
| 5,699,872 A | * | 12/1997 | Miyakawa et al. .......... | 180/291 |
| 5,904,025 A | * | 5/1999 | Bass et al. ................... | 52/741.3 |
| 5,988,734 A | * | 11/1999 | Longo et al. ........... | 296/203.01 |
| 6,109,653 A | * | 8/2000 | Maruyama et al. .......... | 280/781 |
| 6,217,109 B1 | * | 4/2001 | Okana et al. ........... | 296/203.03 |
| 6,270,153 B1 | * | 8/2001 | Toyao et al. ................. | 296/204 |
| 6,468,613 B1 | * | 10/2002 | Kitano et al. ............... | 428/35.8 |
| 6,592,175 B2 | * | 7/2003 | Shibata ................... | 296/203.02 |
| 2002/0043821 A1 | * | 4/2002 | Takashina et al. ...... | 296/203.03 |
| 2003/0001377 A1 | * | 1/2003 | Ishii et al. ................... | 280/785 |
| 2003/0042753 A1 | * | 3/2003 | Achleitner ............. | 296/203.03 |

FOREIGN PATENT DOCUMENTS

| | | | |
|---|---|---|---|
| DE | 199 61 822 | * | 11/2000 |
| FR | 2793 207 | * | 11/2000 |
| JP | 10 1065 | * | 1/1998 |
| JP | 2000 211551 | * | 8/2000 |
| JP | 2000 233765 | * | 8/2000 |
| JP | 2000 289654 | * | 10/2000 |
| JP | 2003 118632 | * | 4/2003 |

* cited by examiner

Primary Examiner—Kiran Patel
(74) Attorney, Agent, or Firm—Merchant & Gould, P.C.

(57) ABSTRACT

A vehicle body frame structure includes a first frame member having a high strength and a second frame member having a strength lower than that of the first frame member. The first frame member and the second frame member are joined integrally in line with each other, and the second frame member has a locally reinforced region in a joined section by fixation of a support member for supporting a part. The structure further includes a joint stiffener fixed to the second frame member. The stiffener functions so that the strength of the joined section gradually decreases from the first frame member to the second frame member.

2 Claims, 9 Drawing Sheets

VEHICLE BODY FRAME STRUCTURE

BACKGROUND OF THE INVENTION

1. Field of the Invention

The present invention relates to a body frame structure of a vehicle, particularly a motor vehicle.

2. Description of the Related Art

In a conventional motor vehicle body frame, for example, a floor frame structure extending in the longitudinal direction beneath a floor panel of a vehicle body and being fixed thereto as shown in FIG. 9 is formed by integrally joining, by welding and the like, the rear end of a front floor frame of a front half vehicle body and the front end of a rear floor frame of a rear half vehicle body, the front floor frame being designed to have a high strength, and the rear floor frame being designed to have a strength lower than that of the front floor frame. Further, in some cases, a support member is fixed to the rear floor frame having the lower strength, in the joined section in order to support a component such as a fuel tank.

However, when a motor vehicle employs the floor frame structure described above, as shown in the graph (broken line) of FIG. 8 and the perspective view of a floor frame of FIG. 9, welding of the support member generates in the joined section a local area having a cross sectional strength (medium strength area) higher than the other areas of the rear floor frame having the lower strength, so that the cross sectional strength largely changes in the longitudinal direction of the vehicle. In other words, in the joined section between the front floor frame and the rear floor frame, the cross sectional strength changes rapidly, not gradually and continuously in the longitudinal direction. As a result, when an excessively large external force acts on the floor frame in the longitudinal direction, there is a problem that the floor frame buckles at the low strength area of the joined section.

SUMMARY OF THE INVENTION

The present invention has been achieved in view of the above-mentioned circumstances to provide a novel vehicle body frame structure that can prevent a frame from buckling by making the cross sectional strength gradually decrease from a first frame member (front floor frame) to a second frame member (rear floor frame) in a joined section where the first frame member and the second frame member are joined together.

In order to accomplish this, in accordance with a first aspect of the present invention, a vehicle body frame structure has a first frame member having a high strength, and a second frame member having a strength lower than that of the first frame member, the first frame member and the second frame member being joined integrally in line with each other, the second frame member having a locally reinforced region in a joined section by fixation of a support member for supporting a component, wherein a joint stiffener is fixed to the second frame member, the stiffener functioning so that the strength of the joined section gradually decreases from the first frame member to the second frame member. Furthermore, in accordance with a second aspect of the present invention, there is a vehicle body frame structure according to the first aspect wherein the strength of the locally reinforced region of the second frame member is lower than that of the first frame member.

In accordance with each of the aspects of the present invention, even when the reinforced region is locally present, due to the support member being fixed for supporting another component, in the joined section between the first frame member having the high strength and the second frame member having the low strength, the strength of the joined section can be decreased gradually from the first member to the second member, thereby preventing the joined section from buckling.

The above-mentioned object, other objects, characteristics and advantages of the present invention will become apparent from an explanation of a preferred embodiment that will be described in detail below by reference to the attached drawings.

DESCRIPTION OF PREFERRED EMBODIMENT

The present embodiment is a case where the vehicle body frame structure of the present invention is applied to a floor frame, which is rigidly mounted beneath a floor panel of a motor vehicle.

Figure 1:
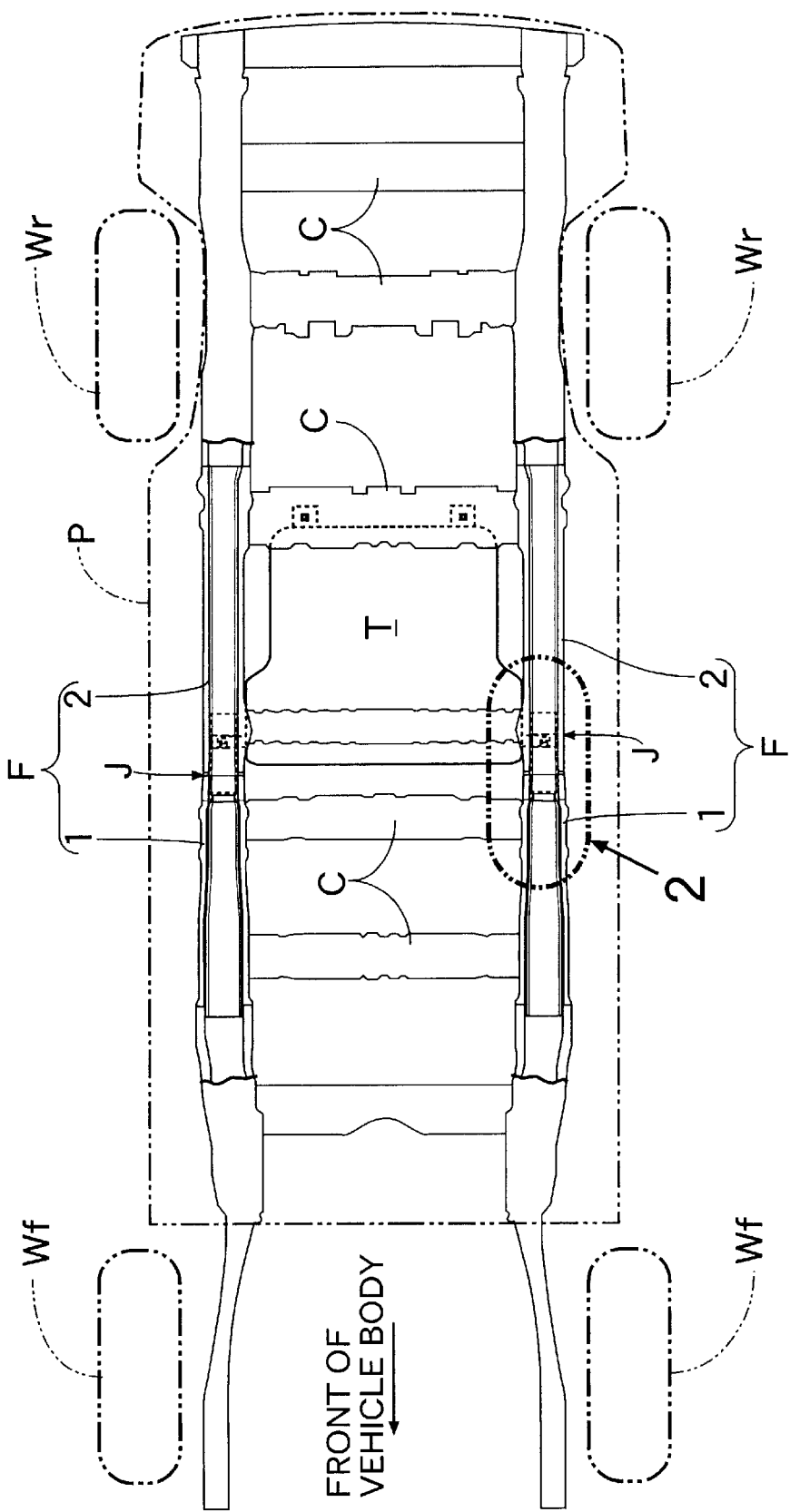
FIG. 1 is a plan view of a floor frame employing a vehicle body frame structure of the present invention.

Referring to FIG. 1, welded to the lower surface of a motor vehicle floor panel P shown by a double-dotted broken line are a pair of left and right floor frames F, F extending in the longitudinal direction with a gap therebetween in the lateral direction. The floor frames F, F correspond to the vehicle body frames of the present invention. The pair of floor frames F, F are joined integrally by welding via a plurality of cross members C.

Each of the floor frames F is formed from a front floor frame 1 having a high strength and a rear floor frame 2 having a strength lower than that of the front floor frame 1. The front end of the rear floor frame 2 and the rear end of the front floor frame 1 are joined integrally by welding in a joined section J that is present between a front wheel Wf and a rear wheel Wr.

Since the pair of left and right floor frames F, F have the same structure, the structure of one thereof (the left floor frame) is explained in detail below by reference to FIG. 1 together with FIGS. 2 to 7.

The front floor frame 1 and the rear floor frame 2 are formed so as to have the same cross-sectional shape so that they can be joined by welding in a fitted-together state in which the rear end of the front floor frame 1 and the front end of the rear floor frame 2 are superimposed in the joined section J.

Figure 2:
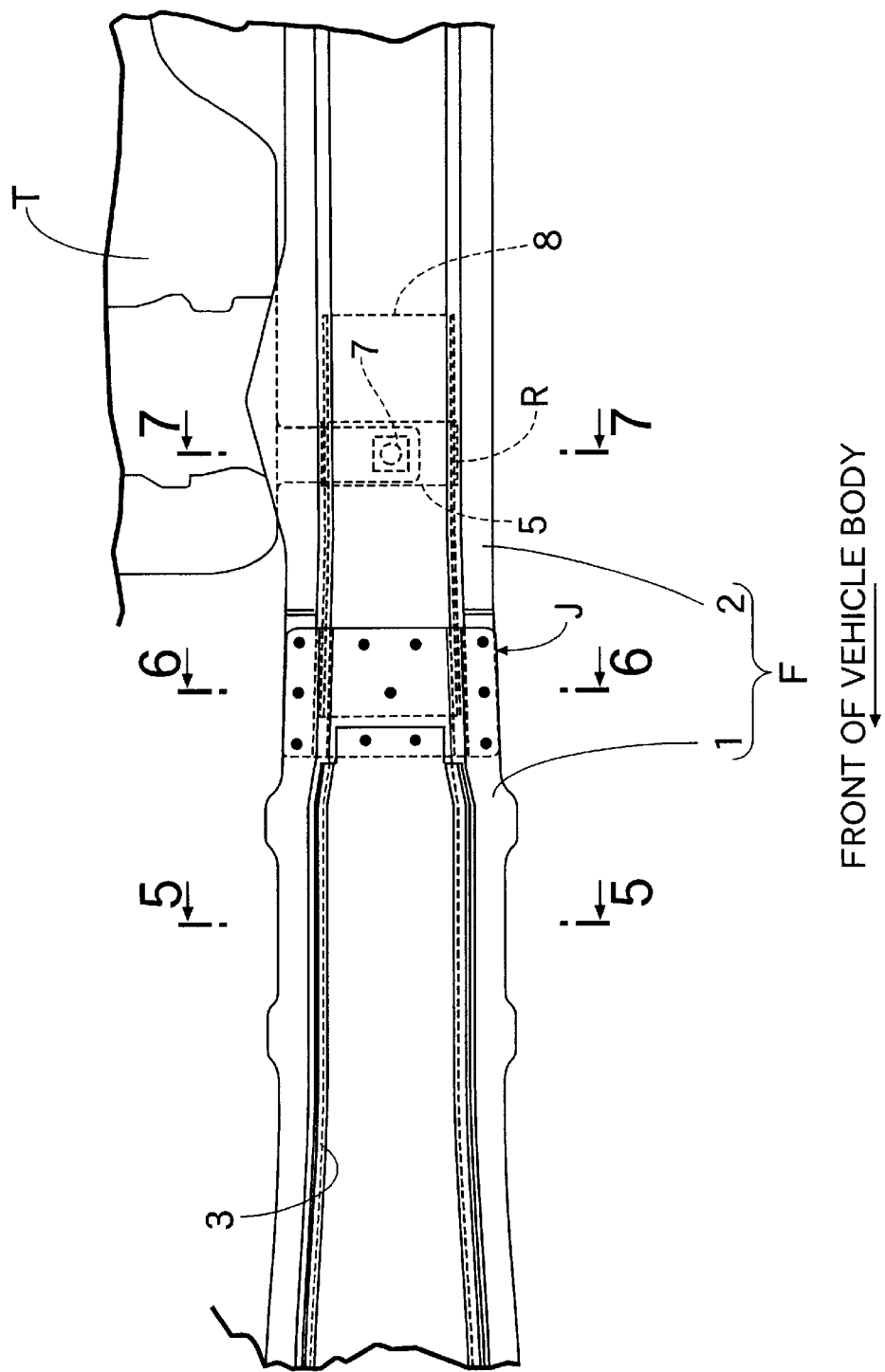
FIG. 2 is a magnified view from arrow 2 of a section enclosed by the phantom line in FIG. 1.
Figure 3:
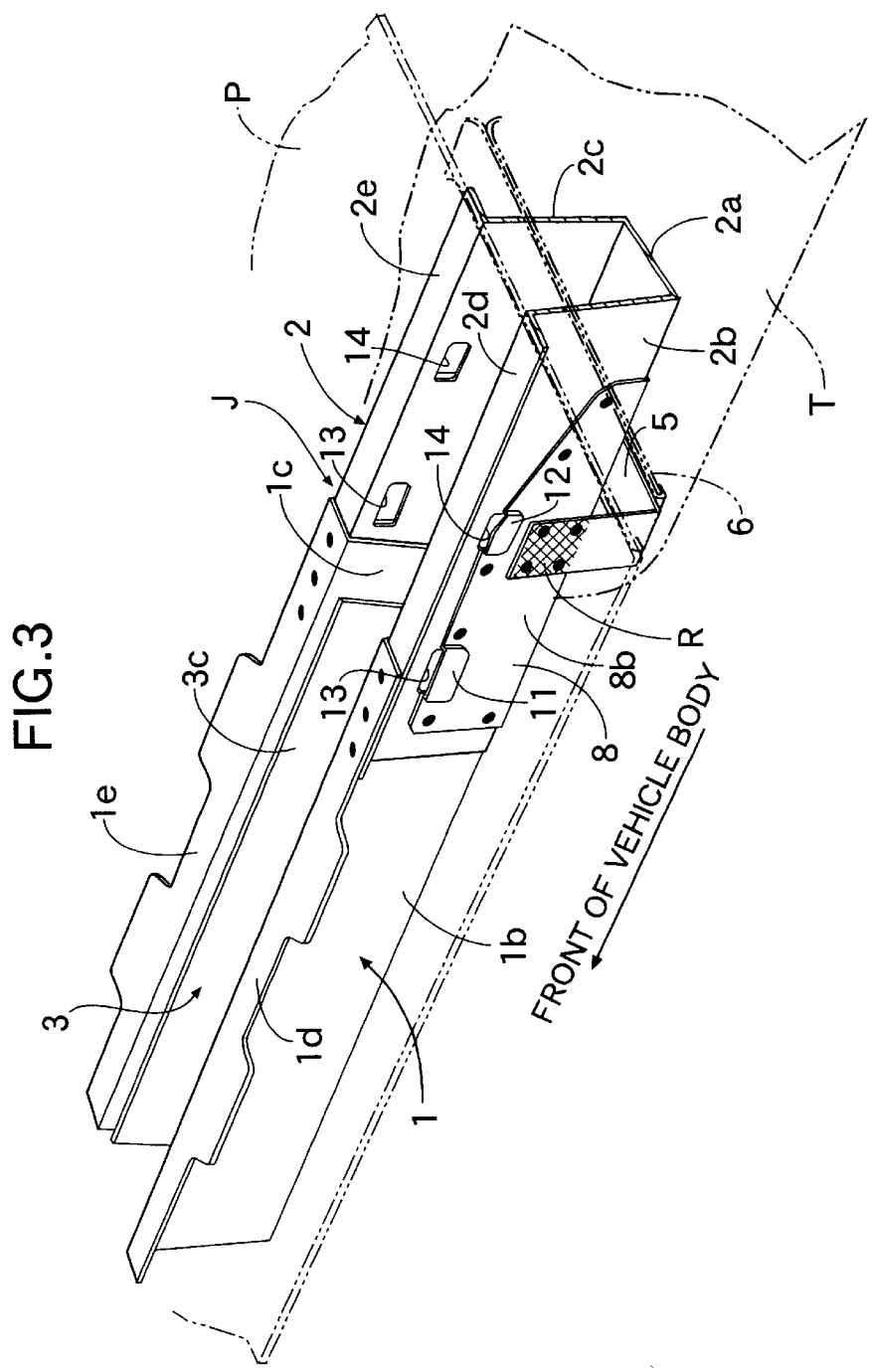
FIG. 3 is a perspective view of a joined section between a front floor frame and a rear floor frame.
Figure 5:
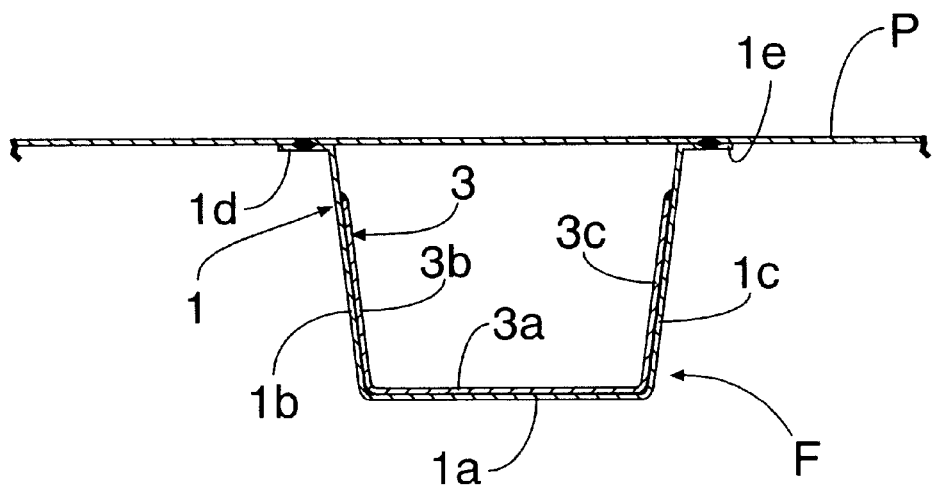
FIG. 5 is a magnified cross section along line 5—5 in FIG. 2.
Figure 6:
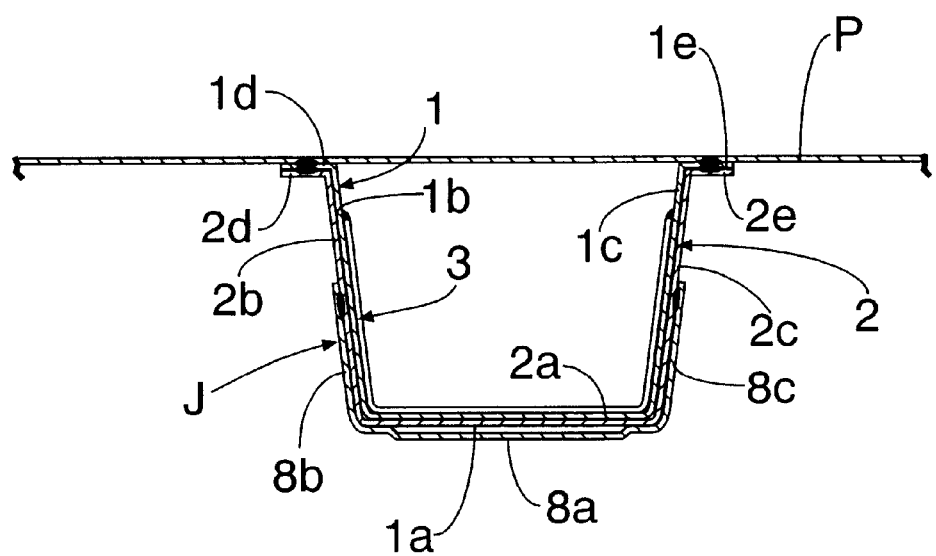
FIG. 6 is a magnified cross section along line 6—6 in FIG. 2.

The front floor frame 1 is made of a metal plate such as a steel plate or an aluminum alloy plate, and as shown in FIGS. 3 and 5, is formed from a base wall 1a, left and right side walls 1b, 1c, and left and right flanges 1d, 1e so as to have a cross section in the form of a channel that opens upward. The left and right side walls 1b, 1c extend from left and right edges of the base wall 1a, and bend to rise at substantially right angles with the space therebetween widening from their lower ends to their upper ends. The left and right flanges 1d, 1e project outward substantially horizontally from the upper edges of the side walls 1b, 1c. The front floor frame 1 is reinforced so as to have a cross sectional strength greater than that of the rear floor frame 2 described below. As shown in FIGS. 2, 3, and 5, a front stiffener 3 is superimposed on and welded to the inner surface of the front floor frame 1. A base wall 3a and opposite side walls 3b, 3c of the front stiffener 3, which has an angular U-shaped cross section, are in intimate contact with and welded to the base wall 1a and the left and right side walls 1b, 1c respectively of the front floor frame 1. As shown in FIGS. 5 and 6, the upper edges of the front stiffener 3 are positioned slightly below the upper surface of the front floor frame 1.

Figure 7:
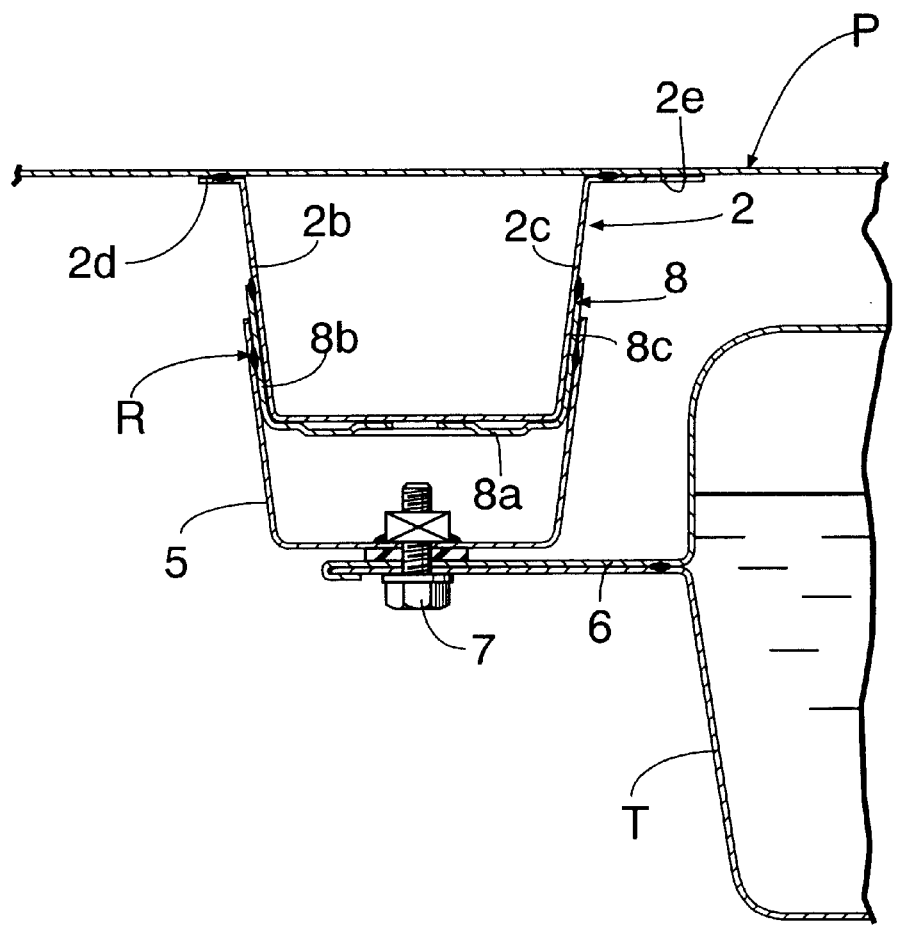
FIG. 7 is a magnified cross section along line 7—7 in FIG. 2.

The rear floor frame 2 is made of the same material as that of the front floor frame 1, and, as shown in FIGS. 3, 6 and 7, is formed from a base wall 2a, left and right side walls 2b, 2c, and left and right flanges 2d, 2e so as to have a cross section in the form of a channel that opens upward. The left and right side walls 2b, 2c extend from left and right edges of the base wall 2a, and bend to rise at substantially right angles with the space therebetween widening from their lower ends to their upper ends. The left and right flanges 2d, 2e project outward substantially horizontally from the upper edges of the side walls 2b, 2c. Since the rear floor frame 2 of the floor frame F is not required to be as strong as the front floor frame 1, reinforcement by a stiffener is not provided unlike the case of the front floor frame 1.

As shown in FIGS. 3 and 6, the rear end of the front floor frame 1 and the front end of the rear floor frame 2 are joined together with the front end of the rear floor frame on the outside, the flanges 1d, 2d; 1e, 2e that are superimposed on each other are welded together, so that the front floor frame 1 and the rear floor frame 2 are joined integrally in line to form the floor frame F.

Welded to a front part of the rear floor frame 2 beneath the floor panel P is a support member 5 for supporting a fuel tank T disposed between the left and right floor frames F, F. As shown in FIGS. 3 and 7, the support member 5 is formed by bending a band-shaped metal plate so as to have an angular U-shaped cross section. Its left and right upper parts are superimposed on and welded to the outer surfaces of the left and right side walls 2b, 2c so as to tightly hold the rear floor frame 2 from outside, with a joint stiffener 8 (described below) therebetween. A flange 6 is rigidly and detachably mounted on the lower surface of the support member 5 by means of bolts and nuts 7 so as to project from a side of the fuel tank T. Since the support member 5 is welded to the front part of the rear floor frame 2, the cross sectional strength of the welded part partially increases and a locally reinforced region R is present. In a case (as in the conventional structure) where there is no joint stiffener 8, which will be described below, as shown by the broken line in FIG. 8, the strength (medium strength) of the part where the support member 5 is welded, that is, the reinforced region R, would become higher than the strength (low strength) of areas to the front and rear of the reinforced region R. As a result, the strength of the front part of the rear floor frame 2 would change discontinuously along the longitudinal direction, and if an excessively large external force were to be applied to the floor frame F in the longitudinal direction, this discontinuity might cause the joined section J between the front floor frame 1 and the rear floor frame 2 to buckle. However, in this embodiment, welding the joint stiffener 8 according to the present invention to the front part of the rear floor frame 2 can reinforce the low strength areas of the rear floor frame 2 to the front and rear of the reinforced region R, thereby preventing the occurrence of the buckling phenomenon.

Figure 4:
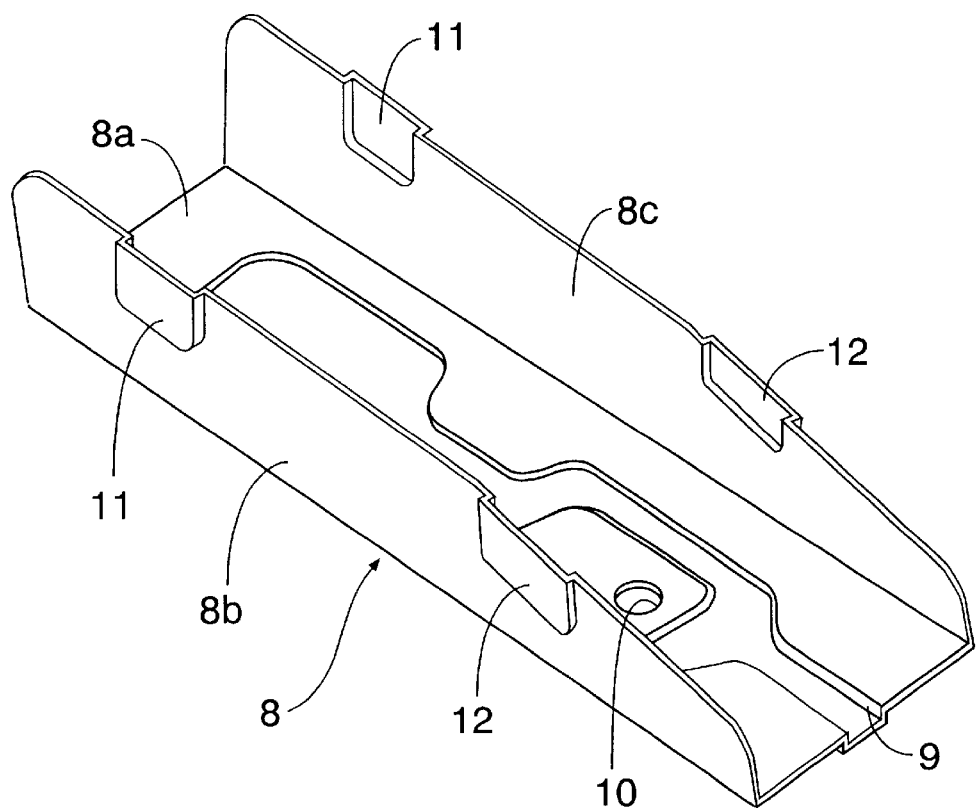
FIG. 4 is a perspective view of a joint stiffener.

The joint stiffener 8 and the structure in which it is fixed to the rear floor frame 2 are explained in further detail below. Referring to FIG. 4, the joint stiffener 8 is formed from a base wall 8a, and left and right side walls 8b, 8c extending from left and right edges of the base wall 8a and bending at substantially right angles so as to have an angular U-shaped cross section. A channel 9 is formed in the base wall 8a along the longitudinal direction, and a welding reference hole 10 opens in the channel 9. The channel 9 is for causing a rustproofing agent (electrocoat) to flow into the joint stiffener 8. Projections 11, 12 are formed in front and rear parts of each of the left and right side walls 8b, 8c of the joint stiffener 8. These projections 11, 12, together with holes 13, 14 formed on opposite side walls 2b, 2c of the rear floor frame 2 as described below, cause the rustproofing agent to flow into the interior of the floor frame F.

As most clearly shown in FIGS. 3 and 4, the upper edge of the rear half of each of the side walls 8b, 8c of the joint stiffener 8 is sloped downward to the rear so that the vertical width of these side walls 8b, 8c is gradually decreasing from the front to the rear, whereby the strength of the rear half of the joint stiffener 8 continuously and gradually decreases from the front to the rear.

As shown in FIGS. 3 and 6, the joint stiffener 8 is welded to a front part of the rear floor frame 2, thereby reinforcing the front part. Specifically, the left and right side walls 8b, 8c of the joint stiffener 8 are tightly engaged with the left and right side walls 2b, 2c of the rear floor frame 2 from beneath the rear floor frame 2, and the base wall 8a of the joint stiffener 8 is tightly superimposed on the base wall 2 of the rear floor frame 2. The side walls 8b, 8c of the joint stiffener 8 are welded to the side walls 2b, 2c of the rear floor frame 2. Therefore, the front part of the rear floor frame 2 is reinforced by the joint stiffener 8 so that its strength gradually decreases from the front to the rear.

The left and right side parts of the support member 5 for supporting the fuel tank T are welded to opposite side walls of the joint stiffener 8 so that they overlap the rear half (the part whose vertical width decreases to the rear) of the joint stiffener 8, and the thus-welded region becomes the reinforced region R having a strength higher than that of the regions to its front and rear.

Figure 8:
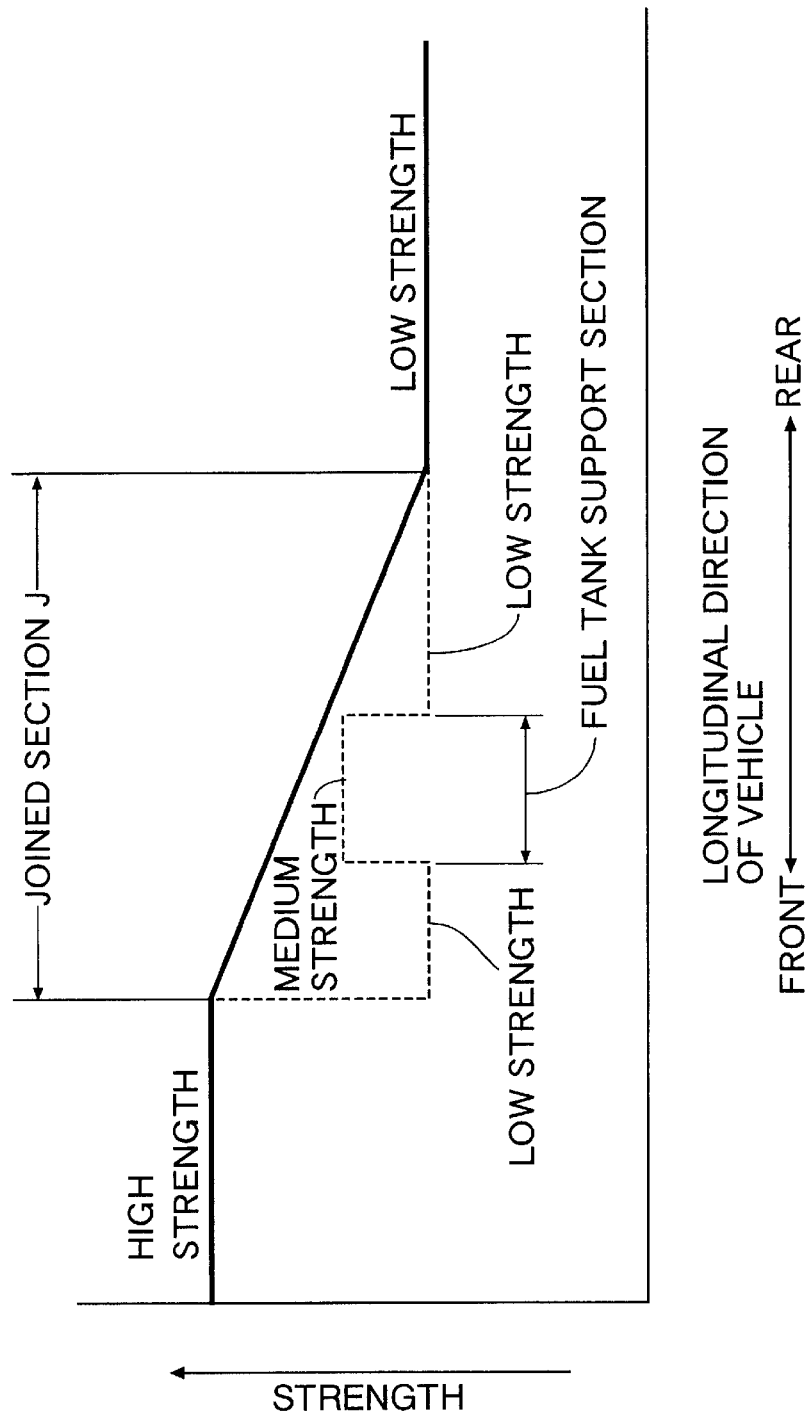
FIG. 8 is a graph showing the change in strength of a floor frame in the longitudinal direction of the vehicle.
Figure 9:
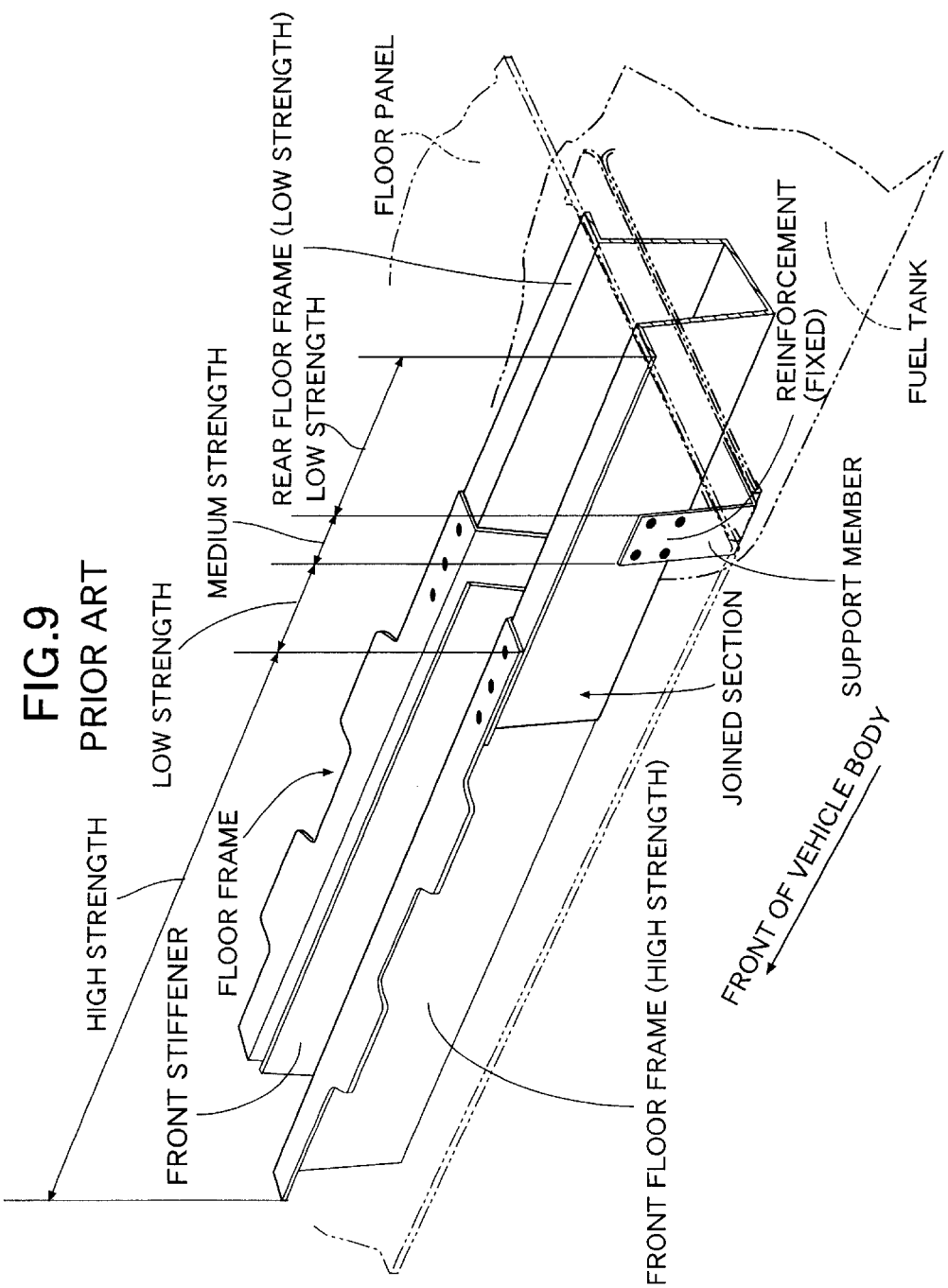
FIG. 9 is a perspective view of a conventional joined section between a front floor frame and a rear floor frame.

As described above, in the present embodiment, since the joint stiffener 8 is welded to the front part of the rear floor frame 2 where a joined section is formed, as shown by the solid line in FIG. 8, the strength of the joined section J between the front floor frame 1 having the high strength and the rear floor frame 2 having the low strength continuously (linearly) and gradually decrease from the front floor frame 1 to the rear floor frame 2, in spite of the presence of a medium strength region having locally high strength (region to which the support member 5 for supporting the fuel tank T is welded) in the front part of the rear floor frame 2. In other words, since the presence of the joint stiffener 8 can prevent an abrupt change in the cross sectional strength of the joined section J, even if an excessively large external force is applied in the longitudinal direction to the floor frame F formed from the front floor frame 1 and the rear floor frame 2, it is possible to prevent the joined section J from buckling.

Although an embodiment of the present invention is explained above, the present invention is not limited by the above-mentioned embodiment and can be modified in a variety of ways without departing from the present invention described in the claims.

For example, the embodiment explains a case in which the vehicle body frame structure of the present invention is applied to the floor frame beneath the floor panel of the vehicle body, but it can of course be applied to another part of the vehicle body frame.

What is claimed is:

1. A vehicle body frame structure comprising:

a first frame member having a high strength; and a second frame member having a strength lower than that of the first frame member, the first frame member and the second frame member being joined integrally in line with each other, the second frame member having a locally reinforced region in a joined section by fixation of a support member for supporting a component;

wherein the structure further comprises a joint stiffener fixed to the second frame member, the stiffener functioning so that a strength of the joined section gradually decreases from the first frame member to the second frame member.

2. The vehicle body frame structure according to claim 1 wherein a strength of the locally reinforced region of the second frame member is lower than that of the first frame member.

* * * * *